US011229049B2

(12) United States Patent
Li et al.

(10) Patent No.: US 11,229,049 B2
(45) Date of Patent: Jan. 18, 2022

(54) METHOD AND APPARATUS FOR IMPLEMENTING PREAMBLE ZONE SELECTION

(71) Applicant: NOKIA TECHNOLOGIES OY, Espoo (FI)

(72) Inventors: Hongchao Li, Beijing (CN); Klaus Ingemann Pedersen, Aalborg (DK); Yuantao Zhang, Beijing (CN); Jingyuan Sun, Beijing (CN); Zhuyan Zhao, Beijing (CN); Deshan Miao, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 524 days.

(21) Appl. No.: 16/088,191

(22) PCT Filed: May 11, 2016

(86) PCT No.: PCT/CN2016/081676
§ 371 (c)(1),
(2) Date: Sep. 25, 2018

(87) PCT Pub. No.: WO2017/193298
PCT Pub. Date: Nov. 16, 2017

(65) Prior Publication Data
US 2020/0305198 A1    Sep. 24, 2020

(51) Int. Cl.
*H04W 74/00* (2009.01)
*H04W 74/08* (2009.01)
(Continued)

(52) U.S. Cl.
CPC ........... *H04W 74/006* (2013.01); *H04L 5/001* (2013.01); *H04L 5/005* (2013.01); *H04L 5/0037* (2013.01);
(Continued)

(58) Field of Classification Search
CPC ............ H04W 74/006; H04W 74/008; H04W 74/0833; H04W 74/0866; H04W 72/0493;
(Continued)

(56) References Cited

U.S. PATENT DOCUMENTS 10,568,142 B2 *   2/2020  Rong ................ H04W 74/0833
2008/0240217 A1*  10/2008 Lee ..................... H04L 27/2647
                                                    375/227

(Continued)

FOREIGN PATENT DOCUMENTS

CN       102215598 A       10/2011
CN       103748947 A       4/2014
(Continued)

OTHER PUBLICATIONS

C. Karupongsiri, K. S. Munasinghe and A. Jamalipour, "A hybrid Random Access method for smart meters on LTE networks," 2016 IEEE Wireless Communications and Networking Conference, Doha, Qatar, Apr. 3-6, 2016, pp. 1-6. (Year: 2016).*

(Continued)

*Primary Examiner* — Joshua Kading
(74) *Attorney, Agent, or Firm* — Squire Patton Boggs (US) LLP

(57) ABSTRACT

A method and apparatus may include receiving configuration signaling from a network node to use a resource pool. The apparatus transmits using contention-based transmission. The method also includes selecting a preamble zone combination from the resource pool. The method may also include transmitting a preamble to the network node using the selected preamble zone combination. A preamble sequence index is used to identify the user equipment.

18 Claims, 12 Drawing Sheets

(51) Int. Cl.
*H04L 5/00* (2006.01)
*H04W 72/04* (2009.01)
*H04W 24/02* (2009.01)
*H04W 28/26* (2009.01)
*H04W 28/16* (2009.01)
*H04L 1/00* (2006.01)
*H04W 28/02* (2009.01)
*H04W 48/08* (2009.01)

(52) U.S. Cl.
CPC ........... *H04W 24/02* (2013.01); *H04W 28/16* (2013.01); *H04W 28/26* (2013.01); *H04W 72/042* (2013.01); *H04W 72/0493* (2013.01); *H04W 74/008* (2013.01); *H04W 74/0833* (2013.01); *H04W 74/0866* (2013.01); *H04L 1/0003* (2013.01); *H04L 5/0007* (2013.01); *H04W 28/0268* (2013.01); *H04W 48/08* (2013.01)

(58) Field of Classification Search
CPC ........... H04W 72/042; H04W 72/0446; H04W 72/0453; H04W 28/26; H04W 28/16; H04W 28/0268; H04W 24/02; H04W 48/08; H04W 48/10; H04W 48/12; H04W 48/14; H04L 5/0037; H04L 5/005; H04L 5/001; H04L 5/0005; H04L 5/0039; H04L 5/0041; H04L 1/0003
See application file for complete search history.

(56) References Cited

U.S. PATENT DOCUMENTS

| | | | | |
|---|---|---|---|---|
| 2010/0103889 | A1* | 4/2010 | Kim | H04W 74/0866 370/329 |
| 2012/0044877 | A1 | 2/2012 | Ratasuk et al. | |
| 2013/0021997 | A1 | 1/2013 | Lee | |
| 2015/0282213 | A1 | 10/2015 | Sun et al. | |
| 2015/0289292 | A1* | 10/2015 | Sun | H04L 27/2646 370/329 |
| 2016/0278127 | A1* | 9/2016 | Sunell | H04W 4/70 |
| 2016/0309519 | A1* | 10/2016 | Quan | H04W 74/006 |
| 2017/0280438 | A1* | 9/2017 | Balachandran | H04W 4/06 |
| 2017/0290040 | A1* | 10/2017 | Dinan | H04L 27/0006 |
| 2018/0359790 | A1* | 12/2018 | Ingale | H04W 28/16 |

FOREIGN PATENT DOCUMENTS

| | | |
|---|---|---|
| WO | 2015122701 A1 | 8/2015 |
| WO | WO 2015/142239 A1 | 9/2015 |

OTHER PUBLICATIONS

International Search Report & Written Opinion dated Jan. 25, 2017 corresponding to International Patent Application No. PCT/CN2016/081676.
Notification of Third Office Action dated Sep. 9, 2020 corresponding to Chinese Patent Application No. 2016800845043, and English translation thereof.
Aug. 21, 2019 Office Action issued in Chinese Patent Application No. 201680084504.3.
Dec. 13, 2019 Extended Search Report issued in European Patent Application No. 16901253.1.
Biral, Andrea et al., "The challenge of M2M massive access in wireless cellular networks," Digital Communications and Networks (2015) Elsevier, Mar. 27, 2015, pp. 1-19.
Notification of Second Office Action dated Apr. 13, 2020 corresponding to Chinese Patent Application No. 201680084504.3, and English translation.
European Communication pursuant to Article 94(3) EPC, corresponding to EP Application No. 16 901 253.1, dated Aug. 19, 2021.

\* cited by examiner

| Parameter | Value |
|---|---|
| System Bandwidth (MHz) | 50 – 100 |
| Sampling Frequency (MHz) | 122.88 |
| Sampling Rate Ts (s) | 8.14E-09 |
| Subcarrier Spacing (kHz) | 60 |
| OFDM symbol length w/o CP (ms) | 0.01666667 |
| FFT size | 2048 |
| TTI length (ms) | 0.125 |
| OFDM symbol No. per TTI | 7 |
| CP | 146 Ts ≈ 1.2 μs |

Fig. 3

| Parameter | Value |
|---|---|
| Resource Pool bandwidth (MHz) | 1.2 |
| Resource Pool duration (ms) | 1 (8 TTIs) |
| Resource Unit bandwidth (MHz) | 0.6 |
| Resource Unit duration (ms) | 0.125*8/7 (7 OFDM symbols and 1 symbol DmRS) |
| Preamble subcarrier spacing (kHz) | 4 |
| Subcarrier No. used by preamble sequence in each Preamble Zone | 89 |
| Preamble Zone No. | 3 |
| Guard bands in terms of Subcarrier No. | 10.5 at each edge of preamble symbol; 6 between Preamble Zones |
| Preamble duration (Ts) | 30720, equals to 2 TTIs, 0.25ms |
| CP (Ts) | 1190 |
| Guard period (Ts) | 1000 |
| Total duration of preamble symbol (Ts) | 32910 |

Fig. 5

| HARQ Process ID | Preamble Zone Selection Signature |
|---|---|
| 0 | PZ#1 |
| 1 | PZ#2 |
| 2 | PZ#3 |
| 3 | PZ#1&2 |
| 4 | PZ#2&3 |
| 5 | PZ#1&2&3 |

Fig. 6

| Preamble Zone Selection Signature | Granularity (No. of Resource Unit) and MCS level |
|---|---|
| PZ#1 | 1 RUs using 16QAM, 1/2 coding rate |
| PZ#2 | 2 RUs using 16QAM, 1/2 coding rate |
| PZ#3 | 4 RUs using 16QAM, 1/2 coding rate |
| PZ#1&2 | 8 RUs using 16QAM, 1/2 coding rate |
| PZ#2&3 | 2 RUs using QPSK, 1/3 coding rate |
| PZ#1&3 | 4 RUs using QPSK, 1/3 coding rate |
| PZ#1&2&3 | 8 RUs using QPSK, 1/3 coding rate |

Fig. 7

METHOD AND APPARATUS FOR IMPLEMENTING PREAMBLE ZONE SELECTION

BACKGROUND

Field

Certain embodiments of the present invention relate to implementing preamble zone selection.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include receiving, by a user equipment, configuration signaling from a network node to use a resource pool. The user equipment may transmit using contention-based transmission. The method may also include selecting a preamble zone combination from the resource pool. The method may also include transmitting a preamble to the network node using the selected preamble zone combination. A preamble sequence index may be used to identify the user equipment.

In the method of the first embodiment, a preamble symbol may be divided into a plurality of preamble zones, and the preamble zone combination may include a combination of the preamble zones.

In the method of the first embodiment, the use of preamble zone combinations may expand a sample space of possible preamble signatures.

In the method of the first embodiment, transmitting the preamble to the network node may include using the preamble zone combination to identify a hybrid-automatic-repeat-request process ID of the transmitting.

In the method of the first embodiment, transmitting the preamble to the network node may include using the preamble zone combination to indicate a possible setting of resource granularity and Modulation and Coding Scheme level.

In the method of the first embodiment, the method may also include indicating a key performance indicator or a quality-of-service level, for contention-based access. A perceived average packet latency may be classified into one of several levels, and each level corresponds to a usable preamble signature.

In the method of the first embodiment, the method may also include indicating an end of contention-based access.

According to a second embodiment, an apparatus may include receiving means to receive configuration signaling from a network node to use a resource pool. The apparatus transmits using contention-based transmission. The apparatus may also include selecting means to select a preamble zone combination from the resource pool. The apparatus may also include transmitting means to transmit a preamble to the network node using the selected preamble zone combination. A preamble sequence index may be used to identify the apparatus.

In the apparatus of the second embodiment, a preamble symbol may be divided into a plurality of preamble zones, and the preamble zone combination may include a combination of the preamble zones.

In the apparatus of the second embodiment, the use of preamble zone combinations may expand a sample space of possible preamble signatures.

In the apparatus of the second embodiment, receiving the configuration signaling may include receiving radio resource control signaling from an evolved Node B.

In the apparatus of the second embodiment, receiving the configuration signaling may include receiving a location, a periodicity, an offset, and a frequency domain location of the resource pool.

In the apparatus of the second embodiment, transmitting the preamble to the network node may include using the preamble zone combination to identify a hybrid-automatic-repeat-request process ID of the transmitting.

In the apparatus of the second embodiment, transmitting the preamble to the network node may include using the preamble zone combination to indicate a possible setting of resource granularity and Modulation and Coding Scheme level.

In the apparatus of the second embodiment, the apparatus may also include first indicating means to indicate a key performance indicator or a quality-of-service level, for contention-based access. A perceived average packet latency is classified into one of several levels, and each level corresponds to a usable preamble signature.

In the apparatus of the second embodiment, the apparatus may also include second indicating means to indicate an end of contention-based access.

According to a third embodiment, a computer program product may be embodied on a non-transitory computer readable medium. The computer program product may be configured to control a processor to perform a method according to the first embodiment.

According to a fourth embodiment, a method may include configuring, by a network node, a user equipment to use a resource pool. The configuring may include transmitting signaling to the user equipment, and the user equipment transmits using contention-based transmission. The method may also include identifying the user equipment by detecting a preamble sequence index. The method may also include receiving data from the user equipment on a preamble zone combination of the resource pool.

In the method of the fourth embodiment, the method may also include identifying a hybrid-automatic-repeat-request process ID, or a possible setting of resource granularity and Modulation and Coding Scheme level, using the preamble zone combination.

In the method of the fourth embodiment, a preamble symbol is divided into a plurality of preamble zones. The preamble zone combination may include a combination of the preamble zones.

In the method of the fourth embodiment, the method may also include receiving an indication that indicates an end of contention-based access.

According to a fifth embodiment, an apparatus may include configuring means for configuring a user equipment to use a resource pool. The configuring may include transmitting signaling to the user equipment, and the user equipment transmits using contention-based transmission. The apparatus may also include first identifying means for identifying the user equipment by detecting a preamble sequence index. The apparatus may also include first receiving means for receiving data from the user equipment on a preamble zone combination of the resource pool.

In the apparatus of the fifth embodiment, the apparatus may also include second identifying means for identifying a hybrid-automatic-repeat-request process ID, or a possible setting of resource granularity and Modulation and Coding Scheme level, using the preamble zone combination.

In the apparatus of the fifth embodiment, a preamble symbol is divided into a plurality of preamble zones. The preamble zone combination may include a combination of the preamble zones.

In the apparatus of the fifth embodiment, the use of preamble zone combinations expand a sample space of possible preamble signatures.

In the apparatus of the fifth embodiment, configuring the user equipment to use the resource pool may include transmitting radio resource control signaling from an evolved Node B.

In the apparatus of the fifth embodiment, configuring the user equipment to use the resource pool may include indicating a location, a periodicity, an offset, and a frequency domain location of the resource pool, to the user equipment.

In the apparatus of the fifth embodiment, the apparatus may also include second receiving means that receive an indication that indicates a key performance indicator or a quality-of-service level, for contention-based access. A perceived average packet latency is classified into one of several levels, and each level corresponds to a usable preamble signature.

In the apparatus of the fifth embodiment, the apparatus may also include third receiving means that receive an indication that indicates an end of contention-based access.

According to a sixth embodiment, a computer program product may be embodied on a non-transitory computer readable medium. The computer program product may be configured to control a processor to perform a method according to the fourth embodiment.

According to a seventh embodiment, an apparatus may include at least one processor. The apparatus may also include at least one memory including computer program code. The at least one memory and the computer program code may be configured, with the at least one processor, to cause the apparatus at least to receive configuration signaling from a network node to use a resource pool. The apparatus transmits using contention-based transmission. The apparatus may also select a preamble zone combination from the resource pool. The apparatus may also transmit a preamble to the network node using the selected preamble zone combination. A preamble sequence index is used to identify the user equipment.

According to an eighth embodiment, an apparatus may include at least one processor. The apparatus may also include at least one memory including computer program code. The at least one memory and the computer program code may be configured, with the at least one processor, to cause the apparatus at least to configure a user equipment to use a resource pool. The configuring comprises transmitting signaling to the user equipment. The user equipment transmits using contention-based transmission. The apparatus may also be caused to identify the user equipment by detecting a preamble sequence index. The apparatus may also be caused to receive data from the user equipment on a preamble zone combination of the resource pool.

BRIEF DESCRIPTION OF THE DRAWINGS

For proper understanding of the invention, reference should be made to the accompanying drawings, wherein:

FIG. 3 illustrates an example 5G numerology set, in accordance with certain embodiments of the present invention.

FIG. 5 illustrates numerology for a contention-based transmission format, including preamble and data channel.

FIG. 6 illustrates different HARQ Process IDs and their corresponding Preamble Zone Selection Signatures, in accordance with certain embodiments.

FIG. 7 illustrates a Resource granularity and Modulation and Coding Scheme (MCS) level indication by Preamble Zone Selection Signature, in accordance with certain embodiments of the present invention.

DETAILED DESCRIPTION

Figure 1:
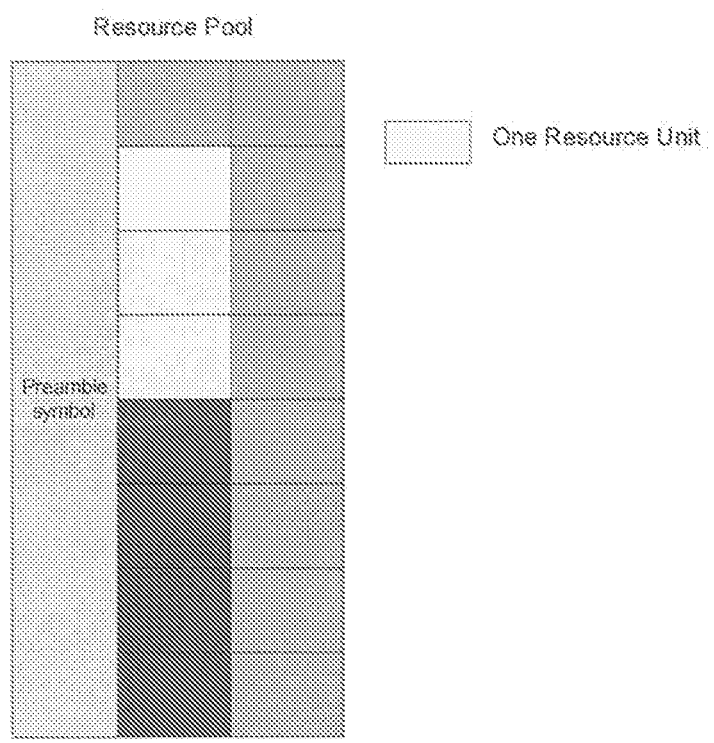
FIG. 1 illustrates a basic resource pool (RP) structure, in accordance with certain embodiments of the present invention.

Certain embodiments of the present invention relate to implementing preamble zone selection in order to expand a sample space of possible preamble signatures. The expanding of the sample space via preamble zone selection (PZS) may be applicable for 5G technologies, and may be applicable to systems that use Non-Schedule based transmission, for example.

In order to shorten latency and in order to reduce signalling overhead, methods of performing Non-Schedule based transmission or contention-based (CB) transmission are being considered in the development of LTE-Pro technologies and, more importantly, in the development of 5G technologies.

Examples of considering Non-Schedule based transmission or contention-based (CB) transmission include: (1) the 5G study item referred to as New RAT (NR) that began on March 2016 in 3GPP Plenary, (2) RP-160671 includes a study item description and schedule, (3) 3GPP TR 38.913 V0.2.0 has specified key scenarios, requirements, and key performance indicators (KPIs), and (4) R1-162892 "Uplink contention-based access in 5G New Radio" introduces contention-based transmission to NR.

Certain embodiments are directed to implementing preamble zone selection in order to expand a sample space of possible preamble signatures. By expanding the sample space of possible preamble signatures, additional preamble signatures are added. These additionally-created preamble signatures can be used by user equipment (UE) to indicate, to evolved Node B (eNB), more control signalling, as compared to the previous approaches. The additional amount of control signalling may improve the reliability of systems that use contention-based communication. The possible functions fulfilled by the proposed preamble zone selection will be described in more detail below.

Many methods of contention-based (CB) transmission use a structure with a preamble, and a data payload that follows the preamble. This data payload may be sent by a user equipment (UE) to a base station and/or evolved Node B (eNB).

A preamble index may be used to identify the UE, and/or to indicate certain control information to eNB, e.g. a resource location of the data packet, HARQ process ID, Data resource granularity, MCS level, perceived CB transmission performance/quality, or certain request to eNB to change the configured resource or change the mode of the transmission. In certain embodiments of the present invention, a preamble index means an index owned by a certain preamble transmission, whose reference is the holistic preamble signature space consisting of two dimensions. They are the sequence used by the preamble and the preamble zone (PZ) selection option used by this transmission of the preamble.

Hence, the possible values of the preamble index constitute a sample space, where the number of possible values of the preamble index corresponds to a maximum number of distinguishable UE that may be supported and/or a maximum number of resource location candidates. For example, assuming a preamble that uses a Zadoff-Chu sequence with a length of N, the number of supported orthogonal preamble signatures is N, due to a good sequence property of zero cross-correlation between sequences with a same root index and with different Cyclic-Shift (CS) values. A preamble signature space of size N can identify a maximum of N UEs, or may indicate a maximum of N resource location candidates.

In general, it may be desirable to expand/enlarge the size of the sample space of possible preamble signatures in order to facilitate more users and/or in order to carry more controlling/reporting information, in order to increase the efficiency/reliability of CB transmission.

Certain embodiments of the present invention may increase the above-mentioned sample space of preamble signatures by introducing a new preamble zone selection method to accommodate more UEs or to provide additional flexibility for the UEs to send more control information. As will be shown by the following examples, the signature space may expanded to be much larger than N.

As described above, one advantage provided by certain embodiments of the present invention is the capability to create a larger sample space of preamble signatures, without introducing additional resource overhead, and while also keeping orthogonality between UEs in the preamble domain. As described above, a preamble signature can serve the function of UE identification and/or the function of control signalling indication.

Compared with the previous approaches, the newly-acquired signatures can help Machine type communication (MTC) or Internet-of-things (IoT) systems to support more UEs and/or to allow more information feedback to be transmitted from UEs, where the UEs may be conducting non-schedule based transmission.

In accordance with certain embodiments, the newly-acquired preamble signatures may be used by UE to indicate some detailed control information, where the newly-acquired preamble signatures are not found in the previous approaches.

FIG. 1 illustrates a basic resource pool (RP) structure. As illustrated by FIG. 1, the CB UEs may choose resources, for performing transmissions, from within the configured resource pool (RP). Furthermore, a UE may transmit a preamble in a preamble symbol by mapping a sequence in the specified time/frequency domain resources, which could be, e.g., the beginning several OFDM symbols within a resource unit (RU) or RP.

The data payload will be transmitted by the UE (to the eNB, for example) in the selected resource unit (RU). The selected number of RUs in this example may be 1, 2, 4, or 8 out of the overall 16 RUs within the RP. The possible numbers of selected RUs may constitute the resource granularity.

In particular, if the allocated subcarrier number for a preamble in the preamble symbol is "N," then the available orthogonal Zadoff-Chu sequence is N, which provides a size N preamble signature space and which supports a maximum of N UEs to allocate in this resource pool (RP). As described above, "N" may correspond to the used sequence length.

Figure 2:
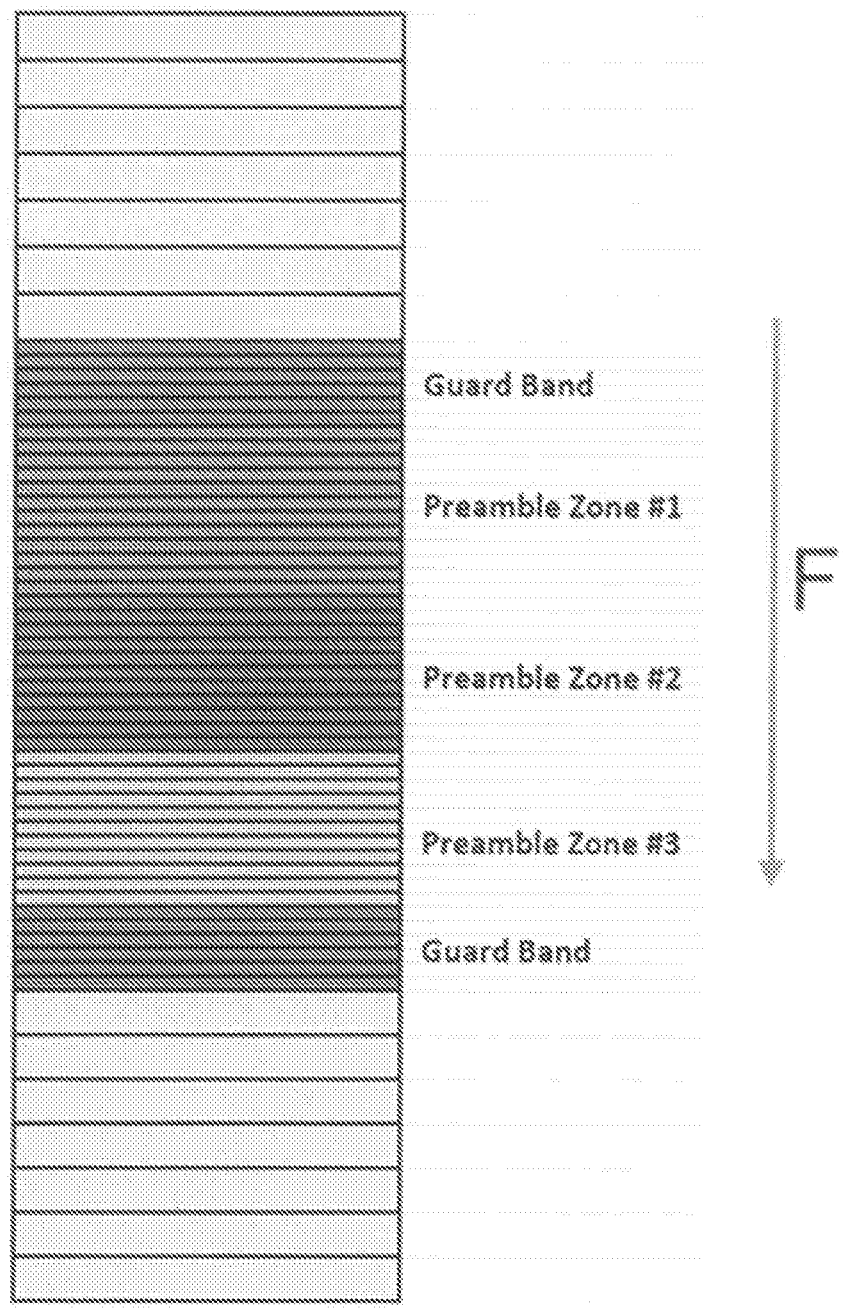
FIG. 2 illustrates an example of preamble zone separation and selection, in accordance with certain embodiments of the present invention.

Certain embodiments of the present invention divide one preamble symbol into multiple Preamble Zones (PZ), as shown in FIG. 2. FIG. 2 illustrates an example of Preamble Zone separation and selection. The example of FIG. 2 displays three Preamble Zones (PZs), which are indexed as PZ #1, PZ #1, and PZ #3. Then, the preamble signature space can be expanded by a new dimension upon performing PZ selection. More specifically, each UE is allocated with a preamble sequence index, and the UE would then pick up a PZ selection signature. The term "preamble index" may be generally interchangeable with the term "preamble signature," where the preamble index is decided by a preamble sequence index and a PZ selection. The PZ selection of PZ zones of FIG. 2 includes all of the following possibilities.

Choosing one PZ to transmit preamble: $C_3^1=3$ options;
Choosing two PZs to transmit preamble: $C_3^2=3$ options;
Choosing all the three PZs to transmit preamble: $C_3^3=1$ option;

Hence, with this new dimension, a total of $N/3\times(C_3^1+C_3^2+C_3^3)=N\times7/3$ signatures are available. If only contiguous PZ selections are considered, for the sake of keeping a single carrier property in order to arrive at a lower UE transmitter peak-average-power-ratio (PAPR), there are N/3×size {PZ #1, PZ #2, PZ #3, PZ #1&2, PZ #2&3, PZ #1&2&3} options, which corresponds to 2×N in total.

If a more general design is considered, where a length N preamble subcarriers are divided into M PZs, then the preamble signature, in total, is: $N/M\times(2^M-1)$, which is much larger than N.

Although detection performance may be degraded due to a shorter sequence in each PZ (assuming that the requirements for performing preamble detection can be met in each PZ), and although more efforts may be directed to detecting PZ combinations, it is still desirable to acquire additional signature space, in view of the advantages of being able to support a larger UE number for a massive MTC use case. Another advantage is that there may be more flexible control information feedback.

With certain embodiments, the expanded sample space of preamble signatures is able to provide additional flexibility and is able to save signalling overhead for a detailed design. For example, a preamble sequence index may be used for identifying each UE.

With regard to HARQ process ID, a preamble sequence index may identify UE, and a PZ selection signature may indicate the HARQ process ID. Based on the HARQ process ID, the eNB can provide feedback in the form of "ACK," corresponding to an acknowledgment of the eNB's receipt of a specific transmission block of a certain HARQ process.

With regard to data resource granularity, in the example of FIG. 1, the resource granularity for the data payload could be chosen from {1, 2, 4, 8}. The resource granularity may then be indicated by the UE to the eNB, via the PZ selection signature. Thus, certain embodiments may maintain flexibility of resource selection for CB, and resource granularity information may be more reliably transmitted via a preamble signature. The complexity of eNB blind decoding may be reduced with this granularity information.

A combination of data resource granularity and Modulation and Coding Scheme (MCS) level may also be indicated. For example, several data channel formats could be fixed with each other. Each format with a fixed combination of Resource Unit numbers and MCS levels may be associated with a particular preamble signature Additionally, the UE can select a proper preamble signature to indicate a perceived KPI or Quality-of-Service (QoS) level for CB access. For example, a perceived average packet latency could be classified into several levels. Each level may correspond to one of the usable preamble signatures, which could be used to indicate, to the eNB, the UE's perceived latency level.

The UE can also indicate the end of a CB access with a specifically-configured preamble signature, this indication may prompt a release of a CB resource, and this indication may prompt a change to schedule-based mode.

In view of the above, certain embodiments of the present invention may be directed to a Preamble Zone structure with a detailed numerology design. Certain embodiments may be directed to a new preamble signature to facilitate non-schedule based transmission. Certain embodiments may also be directed to related signalling and procedures.

Figure 4:
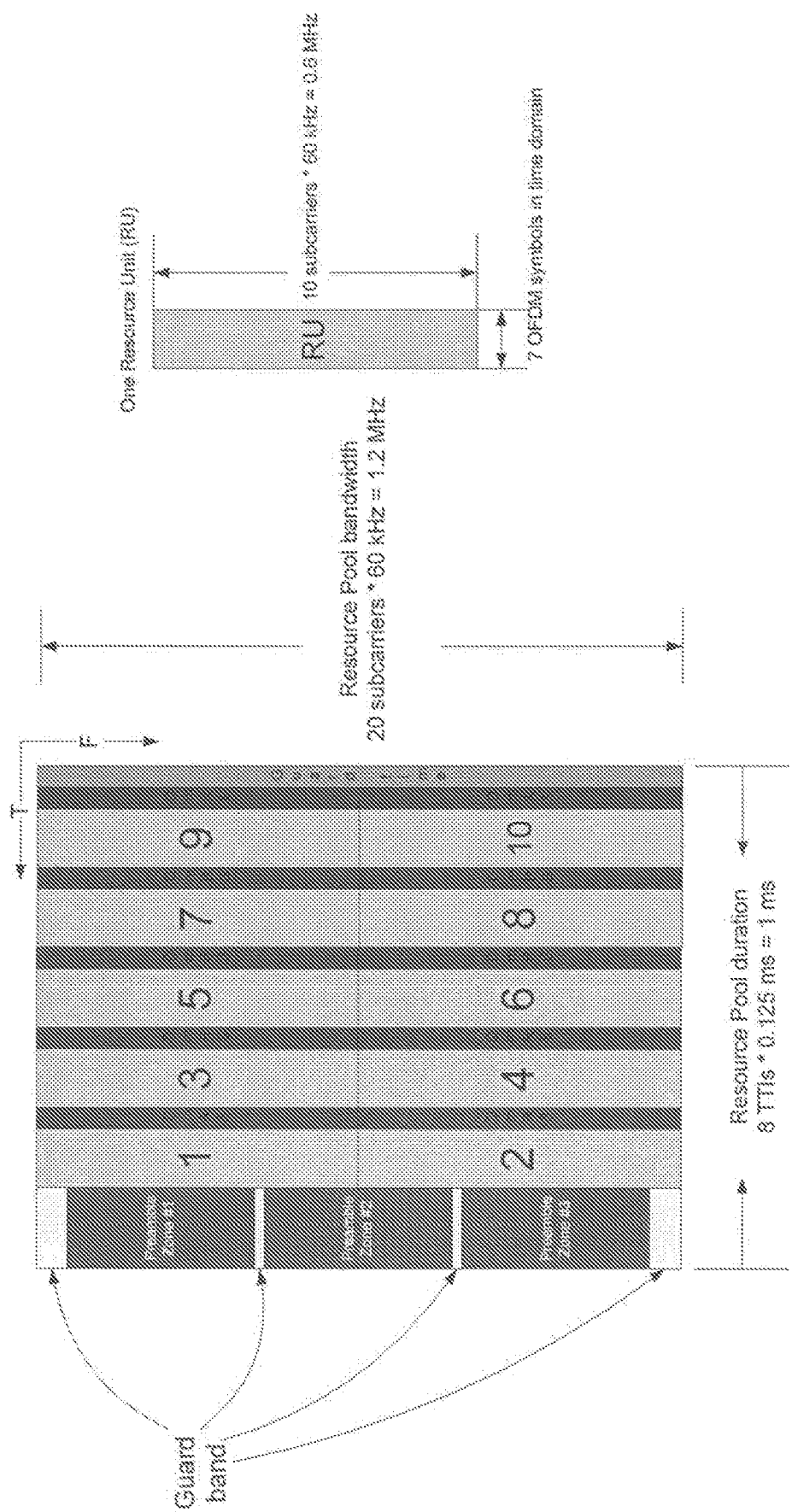
FIG. 4 illustrates an example of a Preamble Zone splitting structure, a resource pool, and a resource unit arrangement.

FIG. 3 illustrates one example 5G numerology set. Taking one example 5G numerology as a benchmark, which is illustrated by FIG. 3, one example implementation of certain embodiments is illustrated by FIGS. 4 and 5. FIG. 4 illustrates an example of a Preamble Zone splitting structure, Resource Pool, and Resource Unit arrangement.

In FIG. 4, within one Resource Pool, one preamble orthogonal frequency-division multiplexing (OFDM) symbol is divided into 3 Preamble Zones, and the following resource for data packet is further organized as 10 Resource Units for a contention-based UE to select. In each Resource Unit, there is one symbol of demodulation reference signal (DmRS). At the end of the Resource Pool, one OFDM symbol is left blank as a Guard Period. Detailed parameters of preamble and Resource Unit are summarized in FIG. 5. FIG. 5 illustrates an example numerology for a contention-based transmission format, including a preamble and data channel.

In this case, the preamble signature space is Preamble_Length_Per_PZ×Number_PZ_Selection_Options=89× 7=623, while the original preamble signature space is around 271, if a prime number is chosen. Hence, the boosting may be enormous.

The following are some examples of a detailed procedure, in accordance with certain embodiments. With a first embodiment, at step 1, a UE is configured to use a Resource Pool, such as the resource pool specified in FIG. 4 and FIG. 5. The UE may be configured to use the Resource Pool via Radio Resource Control (RRC) signalling or physical layer downlink control information (DCI) from an eNB. The UE may operate in a contention-based mode. The exact location of this Resource Pool is also indicated to the user equipment. The periodicity, offset, and frequency domain location of this Resource Pool is also indicated to the user equipment.

One unique preamble sequence index is allocated to this UE, and the preamble sequence index is used for user identification. As shown by FIG. 6, 6 Preamble Zone signatures may also be configured by the network to the UE.

The UE can use the preamble zone signatures to indicate, to the eNB, which of the HARQ processes is being used by a certain contention-based transmission block. FIG. 6 illustrates different HARQ Process IDs and their corresponding Preamble Zone Selection Signatures.

At step 2, when data arrives in the buffer of the UE (to be transmitted to the eNB, for example), the UE then uses the configured Resource Pool, selects the Resource Unit(s) to carry one CB transmission block, uses the configured preamble sequence index, and then selects the Preamble Zone combination corresponding to the HARQ process ID of this transmission.

At step 3, the eNB identifies the UE by detecting the preamble sequence index and also decodes the packet HARQ process ID. Then, the eNB can perform the following combining, if applicable, and may feedback ACK if a Cyclic Redundancy Check (CRC) check is right, or otherwise feedback NACK. The eNB combines the received packets with the same HARQ ID, for a higher decoding rate.

With a second embodiment, at step 1, a Resource Pool (such as the pool specified in FIG. 4 and FIG. 5 are configured with Radio Resource Control (RRC) signalling to a UE operating contention-based transmission by eNB. The exact location of this Resource Pool is also indicated. The periodicity, offset and frequency domain location may also be indicated.

One unique preamble sequence index is allocated to this UE, and the unique preamble sequence index may be used for user identification. As shown by FIG. 7, different Preamble Zone Selection signatures selected by the UE may indicate a possible setting of resource granularity and Modulation and Coding Scheme (MCS) level, to the eNB.

FIG. 7 illustrates a Resource granularity and a MCS level indication by a Preamble Zone Selection Signature, in accordance with certain embodiments of the present invention. At step 2, when data comes to the buffer, the UE then uses the configured Resource Pool, selects the Resource Unit(s) to carry one CB transmission block, uses the configured preamble sequence index, and then selects the Preamble Zone combination that corresponds to the selected Resource Unit number and MCS level.

At step 3, the eNB identifies the UE by detecting the preamble sequence index. The eNB then decodes the data payload using the resource granularity information and MCS level conveyed by the preamble zone selection signature. To support different use cases like massive MTC and MTC with coverage enhancement, multiple resource pools can be customized with appropriate parameter configurations.

With a third embodiment, at step 1, two Resource Pools with different characteristics are configured with broadcasting and RRC signalling to UEs that are operating contention-based transmission by eNB. The exact location of each Resource Pool is also indicated. The periodicity, offset, and frequency domain location may also be indicated. Further, for the first resource pool with this proposed Preamble Zone Selection feature, the structure as shown in FIG. 4 may be used to support a massive number of UEs. To save RRC signalling overhead, broadcasting is assumed to be used here, and UEs may read the corresponding configuration. For the second resource pool, a structure as shown by FIG. 1 may be employed to provide a longer preamble, which may be used for UEs needing coverage enhancement due to the deep loss. The configuration may be carried by RRC signalling.

At step 2, the UEs (that operate massive MTC service) could autonomously select from the preamble signature spaces as per the configuration of the first resource pool.

Then, the eNB could differentiate the UEs by preamble signature detection. If certain UEs suffer from constant failure when sending contention-based packets using the resource and preamble in the first resource pool, they may choose to deliver packets by switching to the second resource pool with longer preamble sequences. This may alleviate the constant failure and resulting long latency, which may be caused by deep loss. In this case, operating in coverage enhancement mode would be more realistic and beneficial than following the configuration in the first resource pool for these UEs.

At step 3, the eNB can also handover certain UEs from one resource pool to another, depending on: (1) the service types that the UE is operating, (2) the active UE number at this moment justifying the massive characteristic, and/or (3) the available resource amount for contention-based transmission.

Other embodiments can also be facilitated by the proposals described above. There are more applicable options enabled by the expanded logic preamble signature space.

Figure 8:
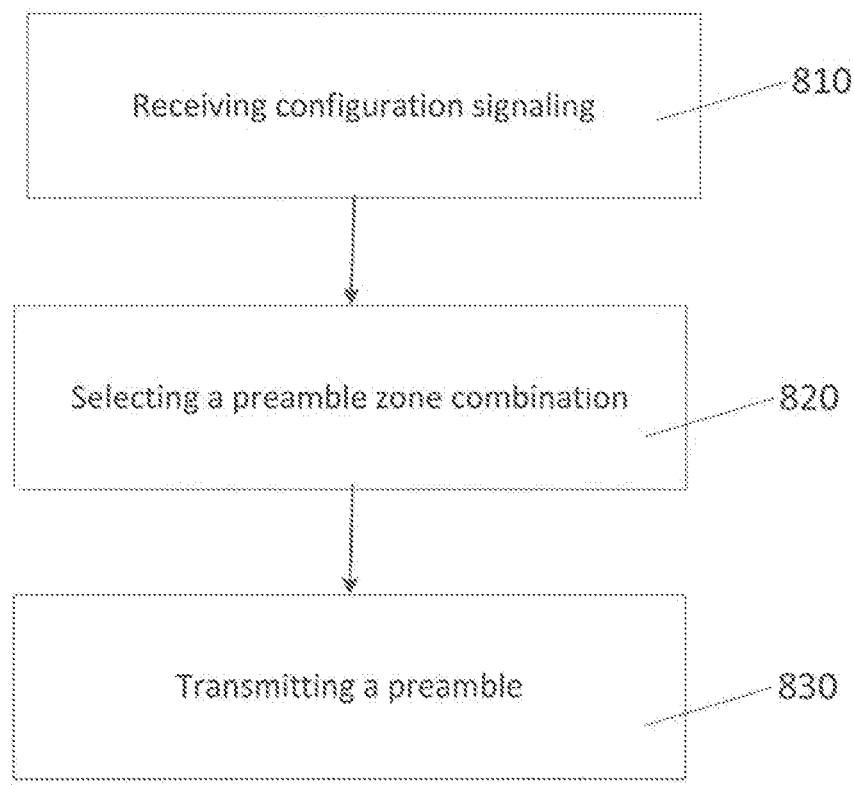
FIG. 8 illustrates a flowchart of a method in accordance with certain embodiments of the invention.

FIG. 8 illustrates a flowchart of a method in accordance with certain embodiments of the invention. The method illustrated in FIG. 8 includes, at 810, receiving, by a user equipment, configuration signaling from a network node to use a resource pool, and the user equipment transmits using contention-based transmission. The method also includes, at 820, selecting, by the user equipment, a preamble zone combination from the resource pool. The method also includes, at 830, transmitting a preamble to the network node using the selected preamble zone combination. A preamble sequence index is used to identify the user equipment.

Figure 9:
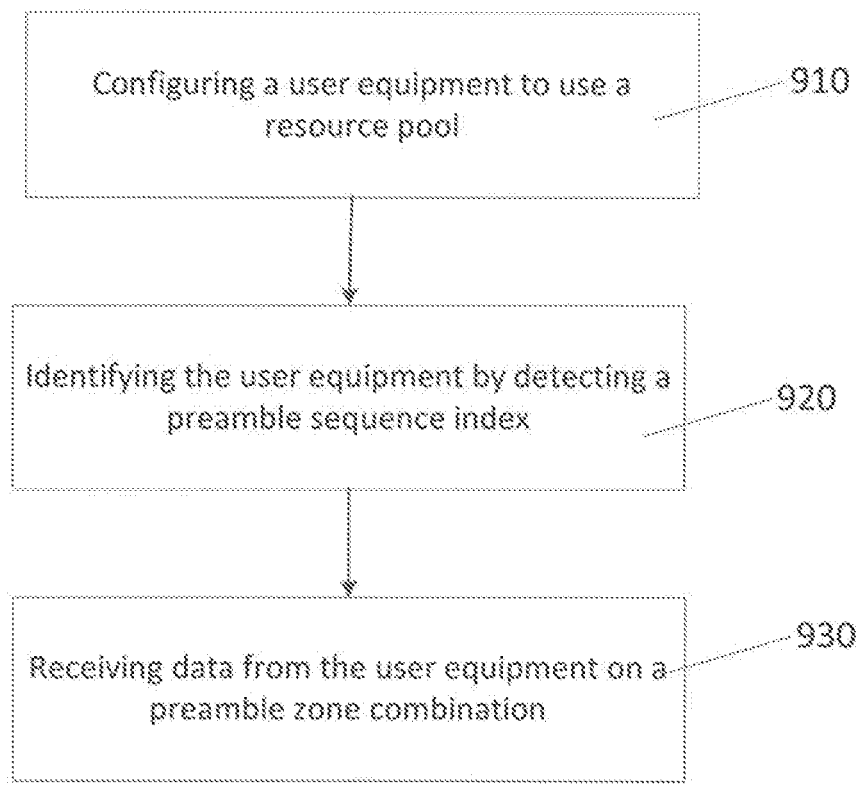
FIG. 9 illustrates a flowchart of a method in accordance with certain embodiments of the invention.

FIG. 9 illustrates a flowchart of a method in accordance with certain embodiments of the invention. The method illustrated in FIG. 9 includes, at 910, configuring, by a network node, a user equipment to use a resource pool. The configuring comprises transmitting signaling to the user equipment, and the user equipment transmits using contention-based transmission. The method may also include, at 920, identifying the user equipment by detecting a preamble sequence index. The method may also include, at 930, receiving data from the user equipment on a preamble zone combination of the resource pool.

Figure 10:
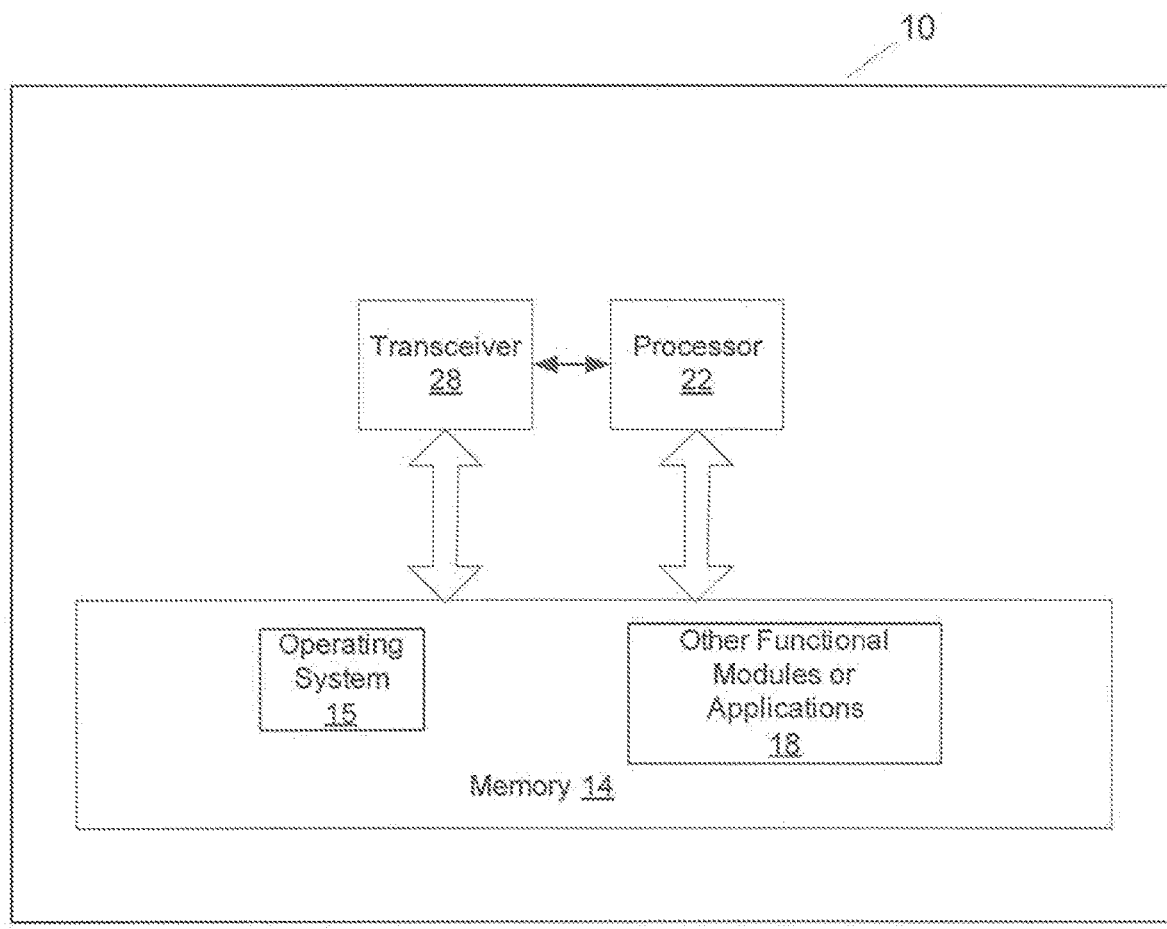
FIG. 10 illustrates an apparatus in accordance with certain embodiments of the invention.

FIG. 10 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 10, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

With certain embodiments, apparatus 10 may be configured to receive configuration signaling from a network node to use a resource pool. Apparatus 10 may transmit using contention-based transmission. Apparatus 10 may also be configured to select a preamble zone combination from the resource pool. Apparatus 10 may also be configured to transmit a preamble to the network node using the selected preamble zone combination. A preamble sequence index is used to identify apparatus 10.

With certain embodiments, apparatus 10 may configure a user equipment to use a resource pool. The configuring comprises transmitting signaling to the user equipment, and the user equipment transmits using contention-based transmission. Apparatus 10 may be configured to identify the user equipment by detecting a preamble sequence index. Apparatus 10 may also be configured to receive data from the user equipment on a preamble zone combination of the resource pool.

Figure 11:
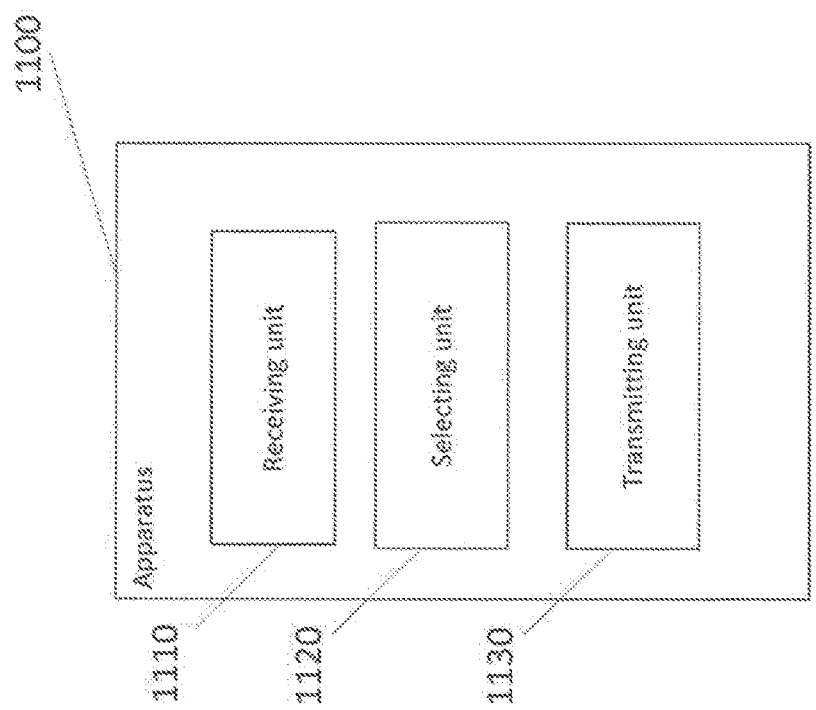
FIG. 11 illustrates an apparatus in accordance with certain embodiments of the invention.

FIG. 11 illustrates an apparatus in accordance with certain embodiments of the invention. Apparatus 1100 can be a user equipment, for example. Apparatus 1100 can include a receiving unit 1110 that receives configuration signaling from a network node to use a resource pool. Apparatus 1100 transmits using contention-based transmission. Apparatus 1100 can include a selecting unit 1120 that selects a preamble zone combination from the resource pool. Apparatus 1100 can also include a transmitting unit 1130 that transmits a preamble to the network node using the selected preamble zone combination. A preamble sequence index is used to identify the apparatus 1100.

Figure 12:
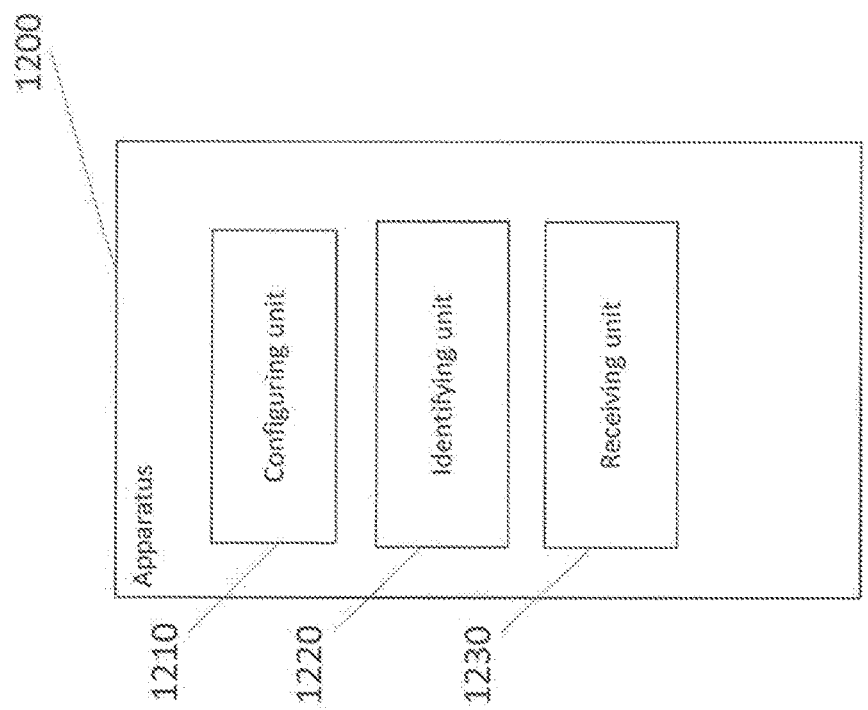
FIG. 12 illustrates an apparatus in accordance with certain embodiments of the invention.

FIG. 12 illustrates an apparatus in accordance with certain embodiments of the invention. Apparatus 1200 can be a base station and/or evolved Node B, for example. Apparatus 1200 can include a configuring unit 1210 that configures a user equipment to use a resource pool. The configuring comprises transmitting signaling to the user equipment. The user equipment transmits using contention-based transmission. Apparatus 1200 may also include a identifying unit 1220 that identifies the user equipment by detecting a preamble sequence index. Apparatus may also include a receiving unit 1230 that receives data from the user equipment on a preamble zone combination of the resource pool.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
    receiving, by a user equipment, configuration signaling from a network node to use a resource pool, wherein the user equipment transmits using contention-based transmission;
    selecting a preamble zone combination from the resource pool, wherein a preamble symbol for transmitting a preamble sequence is divided, in frequency domain, into a plurality of preamble zones, and the preamble zone combination comprises a combination of one or more of the plurality of preamble zones; and
    transmitting a preamble to the network node using the selected preamble zone combination, wherein a preamble sequence index is used to identify the user equipment.

2. The method according to claim 1, wherein transmitting the preamble to the network node comprises using the preamble zone combination to identify a hybrid-automatic-repeat-request process identifier.

3. The method according to claim 1, wherein transmitting the preamble to the network node comprises using the preamble zone combination to indicate a setting of resource granularity and modulation and coding scheme level.

4. The method according to claim 1, further comprising indicating a key performance indicator or a quality-of-service level, for contention-based access, wherein an average packet latency associated with the user equipment is classified into one of a plurality of levels, and each level corresponds to one of a plurality of usable preamble signatures.

5. The method according to claim 1, further comprising indicating an end of contention-based access.

6. An apparatus, comprising:
    at least one processor; and
    at least one memory including computer program code, wherein the at least one memory and the computer program code are configured to, with the at least one processor, cause the apparatus at least to perform:
    receiving configuration signaling from a network node to use a resource pool, wherein the apparatus transmits using contention-based transmission;
    selecting a preamble zone combination from the resource pool, wherein a preamble symbol for transmitting a preamble sequence is divided, in frequency domain, into a plurality of preamble zones, and the preamble zone combination comprises a combination of one or more of the plurality of preamble zones; and
    transmitting a preamble to the network node using the selected preamble zone combination, wherein a preamble sequence index is used to identify the apparatus.

7. The apparatus according to claim 6, wherein the preamble zone combination is configured to expand a sample space of preamble signatures.

8. The apparatus according to claim 6, wherein receiving the configuration signaling comprises receiving a location, a periodicity, an offset, and a frequency domain location of the resource pool.

9. The apparatus according to claim 6, wherein transmitting the preamble to the network node comprises using the preamble zone combination to identify a hybrid-automatic-repeat-request process identifier.

10. The apparatus according to claim 6, wherein transmitting the preamble to the network node comprises using the preamble zone combination to indicate a setting of resource granularity and modulation and coding scheme level.

11. The apparatus according to claim 6, wherein the at least one memory and the computer program code are further configured to, with the at least one processor, cause the apparatus to indicate a key performance indicator or a quality-of-service level, for contention-based access, wherein an average packet latency associated with the user equipment is classified into one of a plurality of levels, and each level corresponds to one of a plurality of usable preamble signatures.

12. The apparatus according to claim 6, wherein the at least one memory and the computer program code are further configured to, with the at least one processor, cause the apparatus to indicate an end of contention-based access.

13. An apparatus, comprising:
    at least one processor; and
    at least one memory including computer program code, wherein the at least one memory and the computer program code are configured to, with the at least one processor, cause the apparatus at least to perform:
    configuring a user equipment to use a resource pool, wherein the configuring comprises transmitting signaling to the user equipment, and the user equipment transmits using contention-based transmission;
    identifying the user equipment by detecting a preamble sequence index, wherein a preamble symbol for transmitting a preamble sequence is divided, in frequency domain, into a plurality of preamble zones, and the preamble zone combination comprises a combination of one or more of the plurality of preamble zones; and
    receiving data from the user equipment on a preamble zone combination of the resource pool.

14. The apparatus according to claim 13, wherein the at least one memory and the computer program code are further configured to, with the at least one processor, cause the apparatus to identify a hybrid-automatic-repeat-request process identifier, or a setting of resource granularity and modulation and coding scheme level, using the preamble zone combination.

15. The apparatus according to claim 13, wherein configuring the user equipment to use the resource pool comprises transmitting radio resource control signaling from a base station or an evolved Node B.

16. The apparatus according to claim 13, wherein configuring the user equipment to use the resource pool comprises indicating a location, a periodicity, an offset, and a frequency domain location of the resource pool, to the user equipment.

17. The apparatus according to claim 13, wherein the at least one memory and the computer program code are further configured to, with the at least one processor, cause the apparatus to receive an indication that indicates a key performance indicator or a quality-of-service level, for contention-based access, wherein an average packet latency associated with the user equipment is classified into one of a plurality of levels, and each level corresponds to one of a plurality of usable preamble signatures.

18. The apparatus according to claim 13, wherein the at least one memory and the computer program code are further configured to, with the at least one processor, cause the apparatus to receive an indication that indicates an end of contention-based access.

* * * * *